United States Patent [19]
Prince et al.

[11] 3,967,344
[45] July 6, 1976

[54] TRANSITION FOR ANIMALS TO BE SLAUGHTERED ON DOUBLE-RAIL SYSTEM

[75] Inventors: Ralph P. Prince; David H. Johnson, both of Storrs; Walter Giger, Jr., Wethersfield, all of Conn.

[73] Assignee: Council of Liverstock Protection, Inc., New York, N.Y.

[22] Filed: Oct. 1, 1975

[21] Appl. No.: 618,468

[52] U.S. Cl............................................. 17/1 A
[51] Int. Cl.² .................................... A22B 5/02
[58] Field of Search................ 17/1 A, 44, 24; 119/158, 96

[56] References Cited
UNITED STATES PATENTS

| | | | |
|---|---|---|---|
| 621,116 | 3/1899 | Mandel | 17/1 R |
| 712,579 | 11/1902 | Nicholson et al. | 17/1 A |
| 3,599,276 | 8/1971 | Edwards | 17/1 A |

*Primary Examiner*—Hugh R. Chamblee
*Attorney, Agent, or Firm*—Moonray Kojima

[57] ABSTRACT

In transferring an animal in the standing position from a chute to a conveyor, such as a double rail arrangement, a triangular wedge movable horizontally is positioned between the chute and the conveyor with a slippery inclined ramp directly under the wedge and with the conveyor positioned below the wedge, whereby the animal attempting to step on the wedge will step on the ramp and when pushed by animals behind it, will step and slide onto the conveyor with its legs upright and straddling the conveyor. A cover is located at rump dimension above the wedge edge so as to prevent the animal from stepping on the wedge and getting off the conveyor while stepping onto the conveyor from the chute.

3 Claims, 3 Drawing Figures

TRANSITION FOR ANIMALS TO BE SLAUGHTERED ON DOUBLE-RAIL SYSTEM

This invention relates to an arrangement for effecting transfer in the upright position of an animal to be slaughtered from a chute to a conveyor.

In copending application Giger, Westervelt Ser. No. 618,463 filed concurrently herewith and assigned to the same assignee hereof, there is disclosed a double rail conveyor in which the animal straddles the double rails and is supported in the upright position by the rails. Advantageously, such double rail system makes possible mechanized shackling of the animals. This requires that the hind legs of the animal always straddle the two rails.

The present invention is an arrangement which enables an animal to go from a chute and be placed properly on the double rails in a straddling and upright position. Briefly, the transition arrangement comprises a wedge having in the top view a truncated triangular shape with the base positioned toward the chute and the top positioned toward the conveyor, and in the side view a sloping top surface inclined downward toward the conveyor; and slippery inclined ramp thereunder. A chute conver is provided over the wedge. The ramp is positioned either before the conveyor or along side the conveyor. The wedge is suitably movable sideways. The animal will attempt to step on the wedge but instead will step on the ramp and due to the pushing from the rear by other animals will slip and slide onto the conveyor in the upright position. The chute cover will prevent the animal from getting up onto the conveyor.

A feature of the invention is the combination of wobbly wedge and inclined ramp disposed thereunder for causing the animal to be placed on the conveyor in an upright position with its legs straddling the conveyor.

A further feature of the invention is the chute positioned at a distance above and sightly more than the rump dimension of the animal to prevent it from climbing onto the conveyor during the transition.

The invention will be further illustrated with reference to the drawings, in which.

Figure 1:
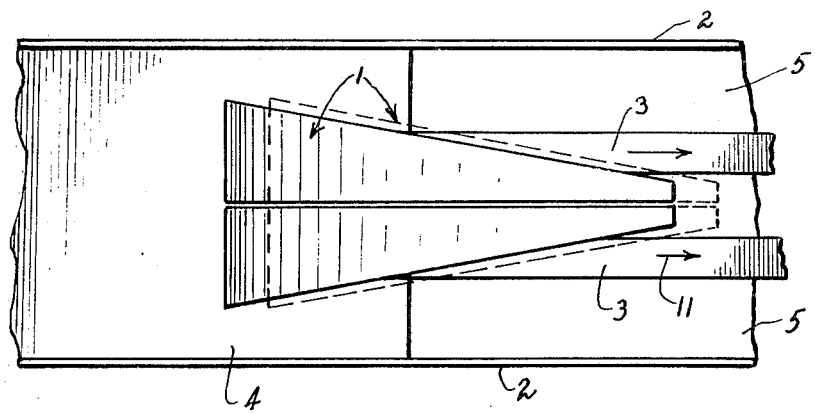
FIG. 1 depicts a top view of an illustrative embodiment.
Figure 2:
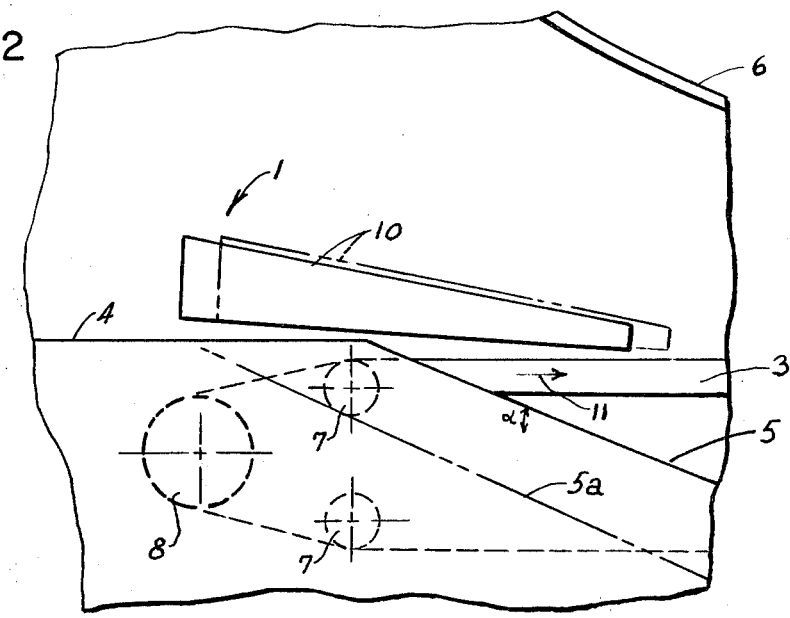
FIG. 2 depicts a side view of the embodiment of FIG. 1.

Turning now to FIGS. 1 and 2, there are depicted a pair of vertically positioned chute sides 2 and within the chutes 2 horizontal platform 4 and extending therefrom an inclined ramp 5 whose angle alpha can be appropriately set, such as at 21°. Located above the ramp 5 and platform 4 is a wedge 1 having a top view shape of a truncated triangle with the base end, whose dimensions, can be for example 10 inches, located toward the chute or platform end and its top end located toward the conveyor. The wedge 1 is suitably anchored in a suitable movable position so that the wedge will be wobbly. The movement may be sideways in a horizontal direction, as depicted, for example plus or minus 1 inch. The top surface of wedge 1 is inclined as depicted in FIG. 2. Located below wedge 1 and between the ramp 5 are double conveyors 3, having movable belts thereon movable away from the chute. The right end of wedge 1 has a width less than the distance between the conveyor belts 3 as shown. These conveyors are driven by rolls 7 and 8. Located above the wedge 1 and also inclined downward as depicted is chute cover 6. The distance between the chute cover 6 and the end of wedge 1 may be slightly larger than the rump thickness of the animal, such as 12 inches. The wedge is movable sideways any suitable distance, such as 1 inch. The distance which the wedge hangs over the platform 4 may be one half or more of the dimension of the wedge. It has been found that moving the ramp 5 to the position shown by dotted lines 5a is particularly advantageous.

Figure 3:
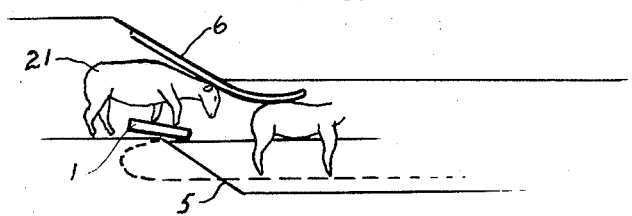
FIG. 3 depicts pictorially the embodiment in operation.

The transition arrangement operates as follows: The animal 21 (see FIG. 3) must be placed on top of conveyor 3 in the upright position with its legs straddling the conveyor 3. The animal will be placed between chute walls 2 and walks on platform 4 walking toward conveyor 3 which are moving to the right as shown by arrows 11. The conveyor 3 may be belts on top of two rails, such as disclosed in Giger, Westervelt application disclosed above. The animal will try to walk on the two conveyors. However, the wedge 1 will interfere and prevent the animal from stepping on the conveyor 3. Instead, the animal will try to step on wedge 1. However, the top edge is sharp and uncomfortable for the animal and the slippery surface will not provide sure footing for the animal. Thus, instead, the animal will step on ramp 5. The ramp is slippery and sharply inclined. Thus, combined with the force of the other animals in back of it pushing, the subject animal will slip and slide onto the conveyors in an upright position with its legs straddling the conveyor. As depicted in FIG. 3, the chute cover 6 is located above the wedge 1 and inclined downward and at a rump distance from the wedge as depicted. Thus, the chute cover 6 will further discourage and prevent the animal from standing on the wedge or conveyor during the transition from platform 4 to conveyor 3.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. A transition arrangement for transferring an animal from a chute to a conveyor, comprising
   a horizontal platform;
   a ramp inclined downward from said platform;
   a triangular wedge having a sloping top surface located above said platform and above said ramp; said triangular wedge having the shape of a truncated triangle with the upper end thereof being between a pair of said conveyors and the bottom end thereof above said platform;
   means for moving said wedge horizontally whereby said animal attempting to step on said conveyors will step on said wedge and slip and slide on said ramp and go upright onto said conveyors with its legs straddling said conveyors; and
   cover means disposed above said wedge at a distance about equal to the rump dimension of said animal for prevent said animal from stepping on said conveyors.

2. The transition arrangement of claim 1, wherein said ramp is at an angle of 21°.

3. The arrangement of claim 1, wherein said ramp is located under said wedge and is connected to said platform at a location close to the bottom of said wedge.

* * * * *